July 1, 1924.
F. C. KIES
1,499,667
COMBINED TIRE CHAIN TIGHTENER AND FASTENER
Filed March 21, 1924
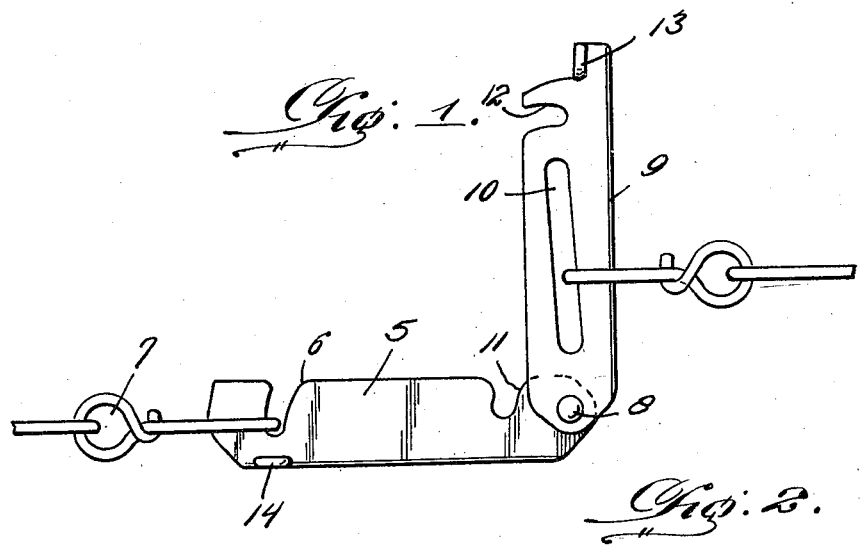
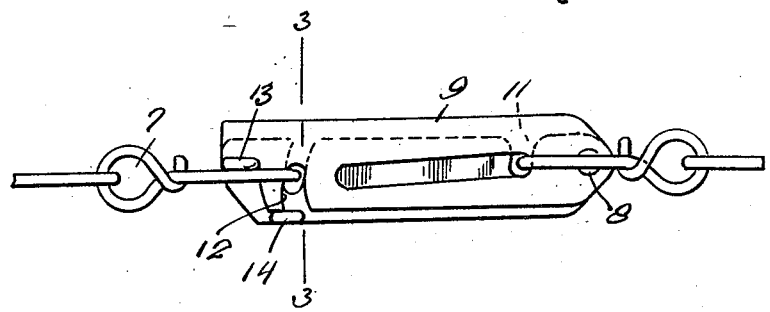
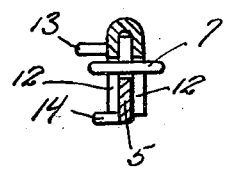
Fred C. Kies,
Inventor
By Clarence O'Brien
Attorney Patented July 1, 1924.

1,499,667

UNITED STATES PATENT OFFICE.

FRED C. KIES, OF MOSCOW, MICHIGAN.

COMBINED TIRE-CHAIN TIGHTENER AND FASTENER.

Application filed March 21, 1924. Serial No. 700,868.

*To all whom it may concern:*

Be it known that I, FRED C. KIES, a citizen of the United States, residing at Moscow, in the county of Hillsdale and State of Michigan, have invented certain new and useful Improvements in Combined Tire-Chain Tighteners and Fasteners, of which the following is a specification.

This invention relates generally to the art of anti-skid chains for motor vehicle wheels and has more particular reference to a combined tightener and fastener for the usual side chains of an anti-skid chain structure, the primary object of the invention residing in the provision of an article of this character wherein said side chains may be readily tightened for taking up slack therein and wherein the ends of said side chains may be securely joined together in such a manner as to prevent the displacement of the anti-skid chain structure from the tire.

An additional object is to provide an article of the above character, wherein the ends of the side chains may be readily disconnected without the employment of any tools and in a simple and expeditious manner for facilitating the detachment of the chains from the tire.

An additional object is to provide a combined tire chain tightener and fastener that may be manufactured and marketed at an extremely small cost and one that is well adapted for the purposes designated.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a side elevational view of my combined tire chain tightener and fastener in a partially open position, Figure 2 is a similar view of the tightener and fastener in a locked position, and Figure 3 is a detailed transverse sectional view taken substantially upon the line 3—3 of Figure 2, and looking toward the left in the general direction of the arrow.

Now having particular reference to the drawing, my novel combined tire chain tightener and fastener constitutes the provision of a blade 5 of suitable metal and being of a desirable length and width. Adjacent the forward end of said blade 5, the upper edge thereof is provided with a curved notch 6 that opens at its upper edge at the upper edge of said blade 5, and within which is adapted to be disposed one end link of the side chains 7 of conventional form of anti-skid chains for vehicle tires.

Pivotally secured as at 8, to the opposite end of said blade 5 is a chain tightening and locking lever 9 of suitable metal and of substantially U-shape in cross section whereby when the same is swung downwardly into the position of Figure 2, the said blade will be substantially inclosed therein as shown in the sectional view, Figure 3.

The side walls of this lever 9 are formed with registering longitudinal slots 10 that terminate adjacent the opposite ends of said lever, it being noted that these slots slightly incline from the front end thereof toward the rear end of said lever for manifestly controlling the rearward sliding movement of the opposite end link of said side chain 7 which is disposed through said registering slots 10.

The blade 5 is formed adjacent the end to which is pivotally secured the lever 9 and upon its upper edge with a notch 11 of relatively less depth than the before mentioned notch 6 of said blade. This latter mentioned notch 11 is adapted for the reception of the end link of the side chain 7 disposed within the registering slots 10 of the lever when the same is moved to a closed position as shown in Figure 2, and it will be apparent that the position of the end link of the side chain carried by said lever will be such that when the device is in locked position as to prevent any tension whatever upon the lever which would otherwise manifestly result in the opening of the lever and the consequent loosening of the chain upon the tire.

Adjacent the forward end of the lever 9 the side walls thereof are formed upon their lower edges with registering curved notches 12 for facilitating the positioning of this end of the lever over the end link of the side chain detachably associated with the blade 5 and for also manifestly preventing the disengagement of this end link from said blade.

There may be and preferably is provided a laterally extending thumb piece 13 formed upon the front end of the lever for facilitating the grasping of the same by the fingers of the operator and in addition to this, the blade 5 is formed at a point beneath the notches 6 with a stop lug 14 to be engaged by the lever in its downwardly swung position in order to prevent any undue binding effect between the upper edge of the blade 5 and the meeting portion between the side walls of the lever 9.

From the foregoing, it will be obvious that I have provided a highly novel, inexpensive and efficient combined tire chain fastener and tightener for the side chains of anti-skid chain structures for vehicle tires.

Numerous advantages of an article of this character will be at once appreciated by those skilled in the art and even though I have herein shown and described the most practical embodiment of the invention with which I am at this time familiar, it is nevertheless to be understood that minor changes may be made in the invention without departing from the spirit and scope of the appended claim.

Having thus described my invention, what I claim as new and desire to secure by Letters Patent is:

In a combined tightener and fastener for the side chain of an anti-skid chain structure, a blade formed at its forward end and at its upper edge with a curved notch for the detachable receptacle of one end link of said side chain, a lever of substantial U-shape in cross section overlapping the other end of said blade and being pivotally secured thereto, the side walls of said lever being formed with a longitudinally extending registering and slightly inclined slot for the reception of the other end link of said side chain, said last mentioned end link adapted to move toward the rear end of said registering slot when the lever is moved to a closed position with respect to the blade due to the inclination of said slots, the upper edge of the blade at a point adjacent the pivotal connection to the lever being formed with a notch for the reception of the side chain end link when said lever is moved to a closed position over the blade, said lever being formed at its front end with side wall slots for the reception of the other end link of the side chain disposed within the forward notch of the blade, means for facilitating the movement of the lever to a closed position, and means formed upon the blade for engagement by the lever for limiting the engagement of the lever over the blade whereby a binding of the upper edge of the blade between the joined edges of the lever side walls is prevented.

In testimony whereof I affix my signature.

FRED C. KIES.